(12) United States Patent
Krippner et al.

(10) Patent No.: US 10,907,644 B2
(45) Date of Patent: Feb. 2, 2021

(54) PUMP IMPELLER, METHOD OF PRODUCING PUMP IMPELLER, AND PUMP WITH THE PUMP IMPELLER

(71) Applicant: Bühler Motor GmbH, Nuremberg (DE)

(72) Inventors: Sebastian Krippner, Langenzenn (DE); Andrea Bindig, Nuremberg (DE); Harald Rausch, Fürth (DE); Jürgen Ehrsam, Fürth (DE); Klaus Weiske, Schwaig (DE)

(73) Assignee: BÜHLER MOTOR GMBH, Nuremberg (DE)

( * ) Notice: Subject to any disclaimer, the term of this patent is extended or adjusted under 35 U.S.C. 154(b) by 143 days.

(21) Appl. No.: 16/267,899

(22) Filed: Feb. 5, 2019

(65) Prior Publication Data
US 2019/0242394 A1    Aug. 8, 2019

(30) Foreign Application Priority Data

Feb. 6, 2018   (DE) .................. 10 2018 201 841

(51) Int. Cl.
*F04D 29/048* (2006.01)
*F04D 29/62* (2006.01)
(Continued)

(52) U.S. Cl.
CPC ........ *F04D 29/048* (2013.01); *B29C 45/0001* (2013.01); *B29C 45/14467* (2013.01);
(Continued)

(58) Field of Classification Search
CPC ...... F04D 29/048; F04D 29/628; F04D 13/06; F04D 29/026; F04D 13/024; F04D 1/00;
(Continued)

(56) References Cited

U.S. PATENT DOCUMENTS

| 6,082,974 A * | 7/2000 | Takemoto ........... F04D 15/0066 |
| | | 417/366 |
| 6,604,917 B2 * | 8/2003 | Casper ................ F04D 13/0606 |
| | | 417/420 |

(Continued)

FOREIGN PATENT DOCUMENTS

| CN | 206917871 U * | 1/2018 |
| DE | 75 24 717 U | 12/1975 |

(Continued)

OTHER PUBLICATIONS

Search Report dated Oct. 29, 2018, issued in counterpart German Patent Application No. 10 2018 201 841.3 (6 pages).

*Primary Examiner* — J. Todd Newton
(74) *Attorney, Agent, or Firm* — Westerman, Hattori, Daniels & Adrian, LLP

(57) ABSTRACT

A pump impeller consisting of at least three different material regions, wherein an impeller wheel with a hollow shaft defines a first material region, a bearing component defines a second material region, and a permanent magnet defines a third material region. The invention furthermore relates to a method for producing the pump impeller, and to a centrifugal pump with the pump impeller. The object of the invention is to provide a robust construction, optimal venting, secure attachment of the bearing component, economic production, and a possibility of axial length tolerance compensation given a pump impeller with plastic-bonded permanent magnets. Furthermore, an optimally accurate unbalance-reduced connection between the bearing component and the magnet material should be producible.

19 Claims, 2 Drawing Sheets

(51) Int. Cl.
*B29C 45/00* (2006.01)
*F04D 13/06* (2006.01)
*F04D 29/02* (2006.01)
*F04D 13/02* (2006.01)
*B29C 45/14* (2006.01)
*B29L 31/00* (2006.01)
*F04D 1/00* (2006.01)

(52) U.S. Cl.
CPC ............ *F04D 13/024* (2013.01); *F04D 13/06* (2013.01); *F04D 29/026* (2013.01); *F04D 29/628* (2013.01); *B29K 2995/0008* (2013.01); *B29L 2031/7496* (2013.01); *F04D 1/00* (2013.01); *F05D 2300/43* (2013.01)

(58) Field of Classification Search
CPC ............ F04D 29/2227; B29C 45/0001; B29C 45/14467; F05D 2300/43; B29K 2995/0008; B29L 2031/7496

USPC ......................................................... 416/174
See application file for complete search history.

(56) References Cited

U.S. PATENT DOCUMENTS

2017/0343006 A1* 11/2017 Ehrsam ................. F04D 29/708
2018/0128279 A1* 5/2018 Ogawa ................ F04D 29/0413

FOREIGN PATENT DOCUMENTS

| DE | 33 05 174 A1 | 9/1984 |
| DE | 10 2006 021 244 A1 | 11/2007 |
| DE | 10 2016 209 311 A1 | 11/2017 |

\* cited by examiner

PUMP IMPELLER, METHOD OF PRODUCING PUMP IMPELLER, AND PUMP WITH THE PUMP IMPELLER

CROSS-REFERENCE TO RELATED APPLICATIONS

The present patent application is based on, and claims priority from, German Application No. DE 10 2018 201 841.3, filed on Feb. 6, 2018, which is incorporated herein by reference in its entirety.

BACKGROUND OF THE INVENTION

(1) Field of the Invention

The invention relates to a pump impeller consisting of an impeller wheel with a hollow shaft, a bearing component, and a permanent magnet. The invention furthermore relates to a method for producing the pump impeller and to a centrifugal pump with the pump impeller.

(2) Description of Related Art Including Information Disclosed Under 37 CFR 1.97 and 1.98

Pump impellers for auxiliary water pumps in motor vehicles or similar applications are frequently provided with plastic-bonded permanent magnets. Both single-piece and multi-part pump impellers are known. In single-piece pump impellers, both the motor and the hydraulic part consist of permanent magnet material. For economic reasons, as little permanent magnet material as possible is to be used, so that it is preferred to use permanent magnet material only where it is necessary, and to use only the base material in the hydraulic region. In principle, the two parts can be produced separately from one another and then assembled. Alternatively, the pump impeller can be insert-molded as an insert with the permanent magnet material in an injection molding tool. Since at least one bearing is generally required, this is pressed into the pump impeller. This is problematic in particular given small dimensions and high alternating loads with regard to temperature and vibrations. When the permanent magnet material is insert-molded around the impeller wheel and the hollow shaft, optimal venting in the injection molding tool is often not possible. This leads to inclusions of gaseous components which are composed of air and outgassings from the plastic material, and thus to a mechanical and magnetic weakening of the permanent magnet.

BRIEF SUMMARY OF THE INVENTION

The object of the invention is therefore to provide a robust construction, optimal venting, secure attachment of the bearing component, economic production, and a possibility of axial length tolerance compensation, given a pump impeller with a plastic-bonded permanent magnet. Furthermore, an optimally accurate unbalance-reduced connection between the bearing component and the magnet material should be producible.

The invention relates to a pump impeller consisting of at least three different material regions, wherein an impeller wheel with a hollow shaft defines a first material region, a bearing component defines a second material region, and a permanent magnet defines a third material region. Since the bearing component and the hollow shaft partially overlap, a radial positive fit and a gap (approximately 0.01 to 0.03 mm gap thickness) which allows sufficient venting but is small enough to close as a result of the production of increasing injection pressure. Once the gap is less than or equal to 0.01 mm, no more melt can be pushed through the gap. At a maximum injection pressure of about 50 Mpa (500 bar), the injection process is ended. The venting point is located at an optimum point for venting and allows almost complete filling of the cavity with plastic material containing magnetic particles. As a result of the extensive lack of in particular large cavities and voids, the permanent magnet is very robust and resistant to temperature change and vibration loads. The breakability and thermal shock sensitivity are in particular reduced. The advantage of this solution is also that all components can be provided with different filling materials according to their function. The impeller wheel is reinforced by glass fibers, the bearing component is tribologically optimized by carbon fibers, and the permanent magnet can be magnetized as a result of magnetic particles. The insert-molding with magnet material results in a positive and partially materially bonded connection of all three components (impeller wheel, bearing component, and permanent magnet) to form an inseparable magnet rotor assembly. It is therefore not possible for the bearing to work loose.

It is provided that a region which belongs neither to the first material region (hollow shaft) nor to the second material region (bearing component) is provided axially between the hollow shaft and the bearing component. This gap is part of a venting path and defines the axial position of a venting region.

It is also provided that the region provided axially between the hollow shaft and the bearing component is a gap filled with permanent magnet material. This gap serves as a venting duct during the injection process and as a positive fit region in the cooled state.

The bearing component and the hollow shaft form an interface with one another. The basic shape of this interface can be cylindrical or conical. When a conical interface is used, a temporary venting gap can open during the injection molding process, which gap closes again as a result of the injection pressure. In the simplest case, the temporary gap is a conical annular gap. The inclination of the cone with respect to a cylindrical surface is preferably between 0° and 15°, wherein it may be 5°, 10°, or 15° (angle $\varphi$).

In addition to the axial gap, a region filled with permanent magnet material or fillable with permanent magnet material can be provided radially between the hollow shaft and the bearing component. This region is a continuation of the venting duct; it may be distributed annularly or intermittently around the circumference.

The geometry of the bearing component and of the hollow shaft is designed in such a way that they are arranged radially positively relatively to one another. This allows for pre-centering and facilitates attaching of the bearing component to the hollow shaft, safe handling, and reliable insertion into an injection molding tool, in particular when an assembly robot is used. When using a cone shape, the plug-in connection is even more optimal.

The bearing component expediently has an outer region, a connecting region, and a bearing region, wherein the connecting region is set back relatively to the outer region. Furthermore, the hollow shaft has a diameter-reduced region at an axially free end. Lastly, the outer region of the bearing component is arranged above the diameter-reduced region, leaving the gap. In order for the gap not to be reducible to zero, the end region of the hollow shaft and the connecting region of the bearing component are adapted to one another in such a way that both inserts can be mounted up to a stop, and that an axial gap nevertheless remains.

During the injection molding process, the gap may expand as a result of the injection pressure and thereby enlarge the venting cross-section. When a radial annular gap is present between the diameter-reduced region of the hollow shaft and the inner surface of the outer region of the bearing component, the inserts are aligned and centered by the arbors of the injection molding tool so that a uniform annular gap is produced. It is also possible to design the regions delimiting the annular gap to be slightly conical. In this embodiment, the injection pressure causes a cross-section enlargement of the radial gap in the first half of the cavity filling as a result of the axial positioning of the inserts. In the second half of the cavity filling, the radial gap is increasingly reduced by the increasing internal cavity pressure.

In principle, the bearing component can also be arranged radially inside a hollow shaft region, leaving a gap.

In order to obtain a plurality of intermittent venting regions radially between the bearing component and the hollow shaft, the outer circumference of the diameter-reduced region can have a shape deviating from a cylinder shell surface or cone shell surface. A corresponding deviation of the outer region of the bearing component would have a similar effect.

A plurality of axial openings are provided in the connecting region. These openings on the one hand serve for venting during the injection molding process and on the other hand as vibration decoupling means during operation of the pump, since the openings reduce the radial stiffness of the bearing component.

In order for the permanent magnet closely connected to the impeller wheel with the hollow shaft on the one hand and the bearing component on the other hand to not develop any cracks due to different thermal expansion coefficients, it is provided to use the same base material, in particular PPS, for all three material regions, wherein the base material of the impeller wheel is filled with glass fibers, the base material of the permanent magnet is filled with magnetic particles, and the base material of the bearing component is filled with carbon fibers. The impeller wheel preferably consists of PPS GF40, the permanent magnet preferably consists of PPS with 60 vol. %. SrFeO, and the bearing component preferably consists of PPS CF30.

It has been found that the position of the gap is critical for optimal venting during the injection molding process; it is therefore proposed that the gap filled with magnet material adjoin the permanent magnet at a central region between the axial ends of the permanent magnet.

It is preferably provided that the gap is arranged at an axial distance of about one third of the length of the permanent magnet from the end distal to the impeller wheel.

The outer region of the bearing component is provided with a radially projecting rib. This rib brings about a positive connection to the magnet material. The rib may be arranged centrally, eccentrically, or at the ends of the outer region. A plurality of ribs or differently shaped projections can also be used. The same applies to the use of a groove or of recesses in the outer region of the bearing component. If ribs or grooves are used, they can have a discontinuity. A positive fit in the direction of rotation is hereby also given so that a rotation of the parts relative to one another is prevented. A positive connection having the same effect can also be produced by a crenellated formation of edges of the outer region. A single projection or recess is also sufficient. However, an approximately centrally arranged rib can be produced most simply because these ribs can also be formed as enlarged mold release flashing. The bearing component (4) is designed as a radial bearing in the described example. However, it is conceivable to also apply the same method for axial bearings.

The invention is also achieved by the features of method of making the pump impeller. The method comprises the following steps: a) providing a preformed impeller wheel with a hollow shaft; b) providing a preformed bearing component; c) inserting the impeller wheel with the hollow shaft and the bearing component into an injection molding tool; d) closing the injection molding tool and injecting a plastic filled with permanent magnet particles, wherein venting takes place via a gap which is present axially between the hollow shaft and the bearing component; e) opening the injection molding tool and removing the pump impeller. The invention is characterized in particular by the use of two inserts, on the one hand the impeller wheel, which is preferably integral with a hollow shaft, and on the other hand the bearing component. These two inserts are connected in a positive or force fit with one another and with a permanent magnet to be produced in the injection molding tool. The plastic-bonded magnet material is injected via a plurality of injection channels from the end distal to the impeller wheel. Venting takes place via the axial gap, a temporary, essentially radial annular gap between the hollow shaft and the bearing component (venting region), the openings in the bearing component, and a central venting path of the injection molding tool.

During the injection molding process, the gap may expand as a result of the injection pressure and thereby enlarge the venting cross-section. When a radial annular gap is present between the diameter-reduced region of the hollow shaft and the inner surface of the outer region of the bearing component, the inserts are aligned and centered by the arbors of the injection molding tool so that a uniform annular gap is produced. It is also possible to design the regions delimiting the annular gap to be slightly conical. In this embodiment, the injection pressure causes a cross-section enlargement of the radial gap in the first half of the cavity filling as a result of the axial positioning of the inserts. In the second half of the cavity filling, the radial gap is increasingly reduced by the increasing internal cavity pressure.

The injection molding tool contains magnets which cause a pre-magnetization or full magnetization of the permanent magnet material. This influences the flow path of the magnet material in such a way that it initially moves along the periphery of the cavity and changes direction at the end of the latter. In the case of conventional methods, air inclusions routinely occur in the process. In this case, however, the air can escape via the gap between the hollow shaft and the bearing component. Surprisingly, it has been found that the position of the gap in a central region brings about optimal venting.

BRIEF DESCRIPTION OF THE SEVERAL VIEWS OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE INVENTION

Figure 1:
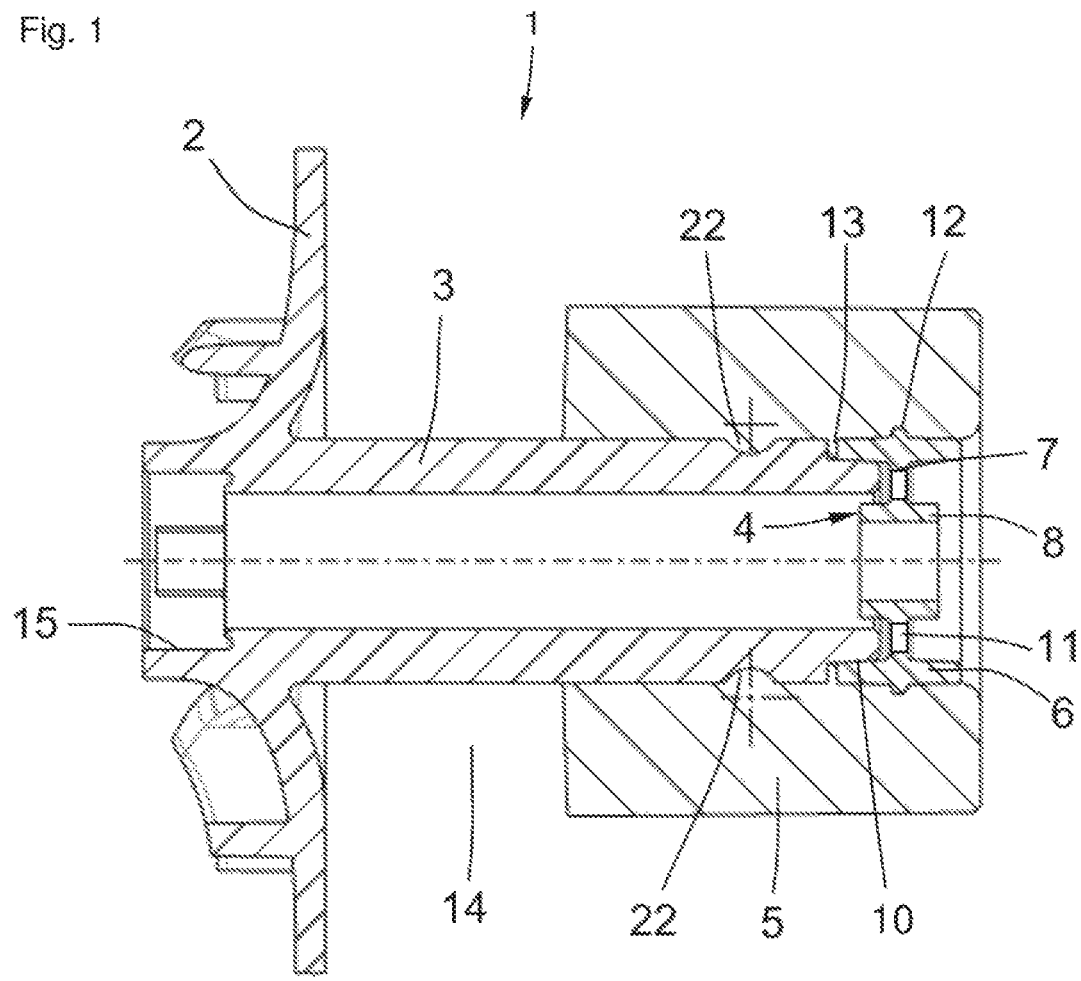
FIG. 1 a sectional view of a pump impeller.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

FIG. 1 shows a sectional view of a pump impeller 1 having: an impeller wheel 2 which is integral with a hollow shaft 3; a bearing component 4; and a permanent magnet 5. Arranged axially between the hollow shaft 3 and the bearing component 4 is a gap 13 which is of groove-like design and whose groove bottom is formed by the hollow shaft 3. The lateral surfaces of the groove are formed on the one hand by the hollow shaft 3 and on the other hand by the bearing component 4. The gap 13 is filled with magnet material of the permanent magnet 5. There is a free space 14 between the permanent magnet 5 and the impeller wheel 2. This free space serves to save on magnet material and to reduce the moment of inertia. The bearing component 4 consists of an outer region 6, a bearing region 8, and a connecting region 7. The outer region 6 and the bearing region are tubular, and the connecting region 7 is disk-shaped. The connecting region has a plurality of openings 11 distributed uniformly over 360°. A region 9 (see FIG. 3) that can be filled with magnet material is present radially between the hollow shaft 3 and the outer region 6 of the bearing component 4. Depending on the amount of magnet material injected, the region 9 can be filled, partially filled, or not filled. Centrally located on the outer region 6 of the bearing component 4 is a rib 12 which does not extend completely around the outer region but has a discontinuity which serves as an anti-rotation element. The pump impeller 1 has a receptacle 15 for another slide bearing (not shown). Belonging to the pump impeller 1 is a cover plate (not shown) which can be mounted on the impeller wheel 2. Within the permanent magnet 5, the hollow shaft 3 has depressions 22 which are filled with permanent magnet material. These depressions 22 are only partially present so that they serve as anti-rotation element and as axial securing element.

Figure 2A:
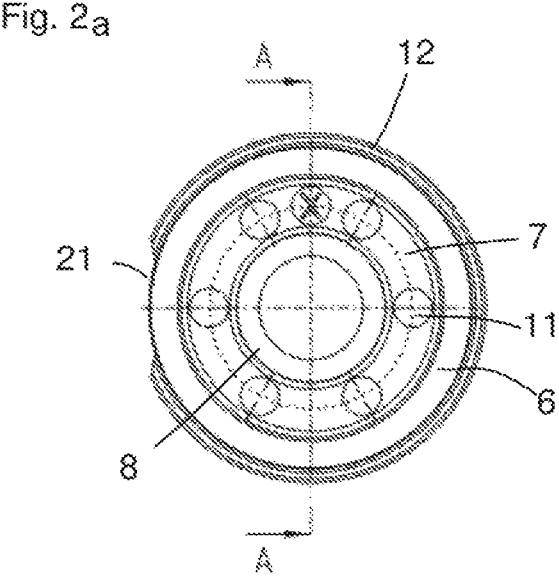
FIGS. 2a and 2b are a front and sectional view of a bearing component.
Figure 2B:
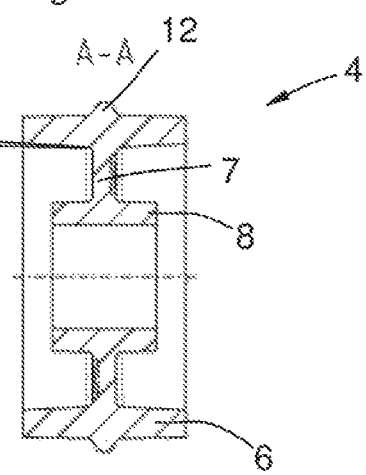

FIG. 2a shows a front view and FIG. 2b shows a sectional view along lines A-A of FIG. 2a view of a bearing component 4, with the outer region 6, the connecting region 7, bearing region 8, the openings 11, the rib 12, and a discontinuity 21 of the rib 12. The discontinuity 21 serves as anti-rotation element. On the inside, the outer region 6 is conical with an angle φ of about 10°.

The bearing component has an outer region, a connecting region, and a bearing region, wherein the connecting region is set back relatively to the outer region. Furthermore, the hollow shaft 3 has a diameter-reduced region 10 at an axially free end. Lastly, the outer region of the bearing component 4 is arranged above the diameter-reduced region 10, leaving the gap 13. In order for the gap 13 not to be reducible to zero, the end region of the hollow shaft 3 and the connecting region 7 of the bearing component are adapted to one another in such a way that both inserts can be mounted up to a stop, and that an axial gap 13 nevertheless remains.

Figure 3:
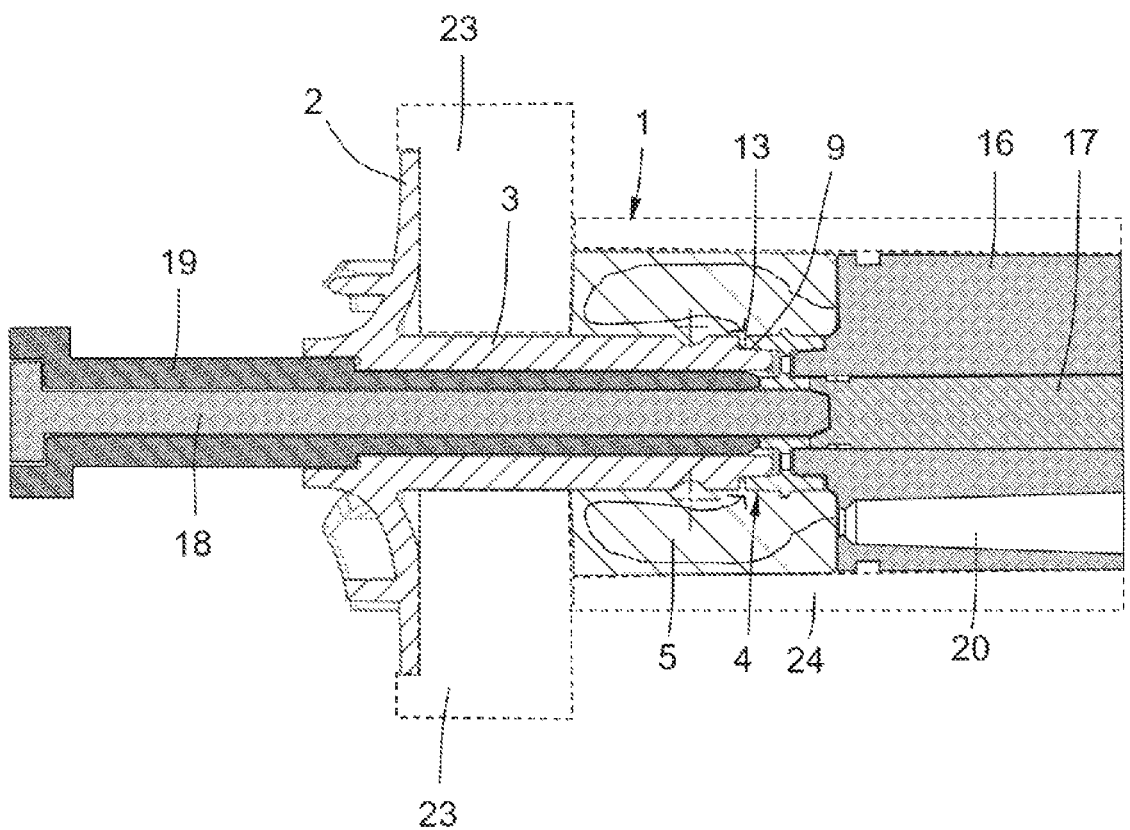
FIG. 3 a sectional view through an injection molding tool with inserts and injected plastic-bonded permanent magnet material.

FIG. 3 is a sectional view through an injection molding tool with inserts and injected, plastic-bonded permanent magnet material. For the sake of simplicity, of the injection molding tool only one gate insert 16 with gate channels 20, a nozzle-side tool core 17, an ejector-side tool core 18, and an ejector 19 are shown. Lateral slides 23 and a further shaped part 24 are indicated by dashed lines. In the injection molding tool, the impeller wheel 2 is accommodated on the ejector 19 and the bearing component 4 is accommodated on the ejector-side tool core 18. Upon insertion into the injection molding tool, the impeller wheel 2 and the bearing component 4 are already pre-assembled. The pre-assembly and insertion are carried out by an assembly robot. During the injection molding process, the tool is closed; the nozzle-side tool core thereby centrally abuts the ejector-side tool core. A gate insert 16 axially closes off the cavity. Plastic material filled with magnetic particles is injected simultaneously via three gate channels 20. A magnetic field in the injection molding tool influences the injection molding compound in such a way that it first moves along the radially outer wall of the tool until an axial end of the tool cavity is reached. Then, the mass is forced inward and axially back toward the gate. In the process, the injection molding compound pushes the air present in the cavity outward through the gap 13 and the venting region 9, as well as through the openings 11 and clearances between the nozzle-side tool core 17 and the gate insert 16. The position of the gap 13 brings about that only minimal or no cavities remain, because the air can escape before the front of the injection molding compound can combine with the material subsequently flowing out of the gate channels.

The invention is also achieved by the features of a method of making the pump impeller. The method comprises the following steps: a) providing a preformed impeller wheel (2) with a hollow shaft 3; b) providing a preformed bearing component 4; c) inserting the impeller wheel 2 with the hollow shaft 3 and the bearing component 4 into an injection molding tool; d) closing the injection molding tool and injecting a plastic filled with permanent magnet particles, wherein venting takes place via a gap 13 which is present axially between the hollow shaft 3 and the bearing component 4; e) opening the injection molding tool and removing the pump impeller 1. The invention is characterized in particular by the use of two inserts, on the one hand the impeller wheel 2, which is preferably integral with a hollow shaft 3, and on the other hand the bearing component 4. These two inserts are connected in a positive or force fit with one another and with a permanent magnet to be produced in the injection molding tool. The plastic-bonded magnet material is injected via a plurality of injection channels from the end distal to the impeller wheel 2. Venting takes place via the axial gap 13, a temporary, essentially radial annular gap between the hollow shaft 3 and the bearing component 4 (venting region 9), the openings 11 in the bearing component 4, and a central venting path of the injection molding tool.

During the injection molding process, the gap 13 may expand as a result of the injection pressure and thereby enlarge the venting cross-section. When a radial annular gap is present between the diameter-reduced region 10 of the hollow shaft 3 and the inner surface of the outer region 6 of the bearing component 4, the inserts are aligned and centered by the arbors of the injection molding tool so that a uniform annular gap is produced. It is also possible to design the regions delimiting the annular gap to be slightly conical. In this embodiment, the injection pressure causes a cross-section enlargement of the radial gap in the first half of the cavity filling as a result of the axial positioning of the inserts.

In the second half of the cavity filling, the radial gap is increasingly reduced by the increasing internal cavity pressure.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

LIST OF REFERENCE SYMBOLS

1 Pump impeller
2 Impeller wheel
3 Hollow shaft
4 Bearing component
5 Permanent magnet
6 Outer region
7 Connecting region
8 Bearing region
9 Venting region
10 Diameter-reduced region
11 Opening
12 Rib
13 Gap
14 Free space
15 Receptacle
16 Gate insert
17 Nozzle-side tool core
18 Ejector-side tool core
19 Ejector
20 Gate channel
21 Discontinuity
22 Depression
23 Slide
24 Shaped part

What is claimed is:

1. A pump impeller comprising:
an impeller wheel with a hollow shaft, the hollow shaft having a free end;
a bearing component partially axially overlapping the hollow shaft, the bearing component having a outer region with a cylindrical surface; and
a permanent magnet connecting to the hollow shaft and the bearing component; and
a gap filled with permanent magnet material, the gap being provided axially between the hollow shaft and the bearing component.

2. The pump impeller according to claim 1, wherein the bearing component and the hollow shaft form an interface with one another.

3. The pump impeller according to claim 2, wherein the basic shape of the interface is cylindrical or conical.

4. The pump impeller according to claim 3, wherein the conical interface is inclined by 0° to 15° (half cone angle φ) with respect to the cylindrical surface of the outer region of the bearing component.

5. The pump impeller according to claim 1, further comprising an area filled with permanent magnet material, the area being provided radially between the hollow shaft and the bearing component.

6. The pump impeller according to claim 1, wherein the bearing component and the hollow shaft are arranged radially relative to one another.

7. The pump impeller according to claim 1, wherein the bearing component further comprises a bearing region and a connecting region joining the outer region and the bearing region, wherein the connecting region is set back with respect to the outer region.

8. The pump impeller according to claim 1, wherein the hollow shaft has a diameter-reduced region at the free end of the hollow shaft.

9. The pump impeller according to claim 8, further comprising a gap formed when the bearing component is arranged above the diameter-reduced region.

10. The pump impeller according to claim 8, wherein the outer circumference of the diameter-reduced region has a shape deviating from the cylindrical surface of the outer region of the bearing component.

11. The pump impeller according to claim 7, wherein the connecting region has a plurality of axial openings.

12. The pump impeller according to claim 1, wherein the permanent magnet, the impeller wheel with the hollow shaft, and the bearing component are made of the same base material, wherein the base material of the permanent magnet is filled with magnetic particles and the base material of the bearing component is filled with carbon fibers.

13. The pump impeller according to claim 1, wherein the gap filled with magnet material adjoins the permanent magnet at a central region between the axial ends of the permanent magnet.

14. The pump impeller according to claim 13, wherein the free end is distal from the impeller wheel and the gap is arranged at an axial distance of about one third of the length of the permanent magnet from the free end.

15. The pump impeller according to claim 7, wherein the outer region of the bearing component has a radially projecting rib.

16. The pump impeller according to claim 1, wherein the bearing component is a radial bearing.

17. A method for producing a pump impeller consisting of an impeller wheel with a hollow shaft, a bearing component, and a permanent magnet, the method comprising the steps of:
a) providing a preformed impeller wheel with a hollow shaft;
b) providing a preformed bearing component;
c) inserting the impeller wheel with the hollow shaft and the bearing component into an injection molding tool;
d) closing the injection molding tool and injecting a plastic filled with permanent magnet particles, wherein venting takes place via a gap which is provided axially between the hollow shaft and the bearing component; and
e) opening the injection molding tool and removing the pump impeller.

18. The method according to claim 17, wherein the injection molding tool has a magnet by which the plastic-bonded particles are aligned and magnetized.

19. A pump comprising:
a pump impeller including an impeller wheel with a hollow shaft, the hollow shaft having a free end;
a bearing component partially axially overlapping the hollow shaft;
a permanent magnet connecting to the hollow shaft and the bearing component; and
a gap filled with permanent magnet material, the gap being provided axially between the hollow shaft and the bearing component.

* * * * *